United States Patent
Liu et al.

(10) Patent No.: US 11,946,556 B2
(45) Date of Patent: Apr. 2, 2024

(54) VALVE BODY

(71) Applicant: NANJING HANSHU ENVIRONMENTAL PROTECTION EQUIPMENT CO., LTD, Nanjing (CN)

(72) Inventors: Guo Liu, Nanjing (CN); Xiaohan Liu, Nanjing (CN)

(73) Assignee: NANJING HANSHU ENVIRONMENTAL PROTECTION EQUIPMENT CO., LTD, Nanjing (CN)

( * ) Notice: Subject to any disclaimer, the term of this patent is extended or adjusted under 35 U.S.C. 154(b) by 361 days.

(21) Appl. No.: 17/485,434

(22) Filed: Sep. 26, 2021

(65) Prior Publication Data

US 2022/0010887 A1 Jan. 13, 2022

Related U.S. Application Data

(63) Continuation of application No. PCT/CN2020/079863, filed on Mar. 18, 2020.

(30) Foreign Application Priority Data

Mar. 29, 2019 (CN) .......................... 201910248951.3

(51) Int. Cl.
*F16K 31/20* (2006.01)
*F16K 1/36* (2006.01)
*F16K 1/46* (2006.01)
*F16K 27/02* (2006.01)

(52) U.S. Cl.
CPC ............ *F16K 27/0245* (2013.01); *F16K 1/36* (2013.01); *F16K 1/46* (2013.01); *F16K 27/0263* (2013.01); *F16K 31/20* (2013.01)

(58) Field of Classification Search
CPC ........ F16K 31/20; F16K 27/0263; F16K 1/46; F16K 1/36; F16K 27/0245
See application file for complete search history.

(56) References Cited

U.S. PATENT DOCUMENTS 4,922,957 A * 5/1990 Johnson .................... F16K 1/46
  137/902
2018/0363792 A1* 12/2018 Baarda .................... F23N 1/007

FOREIGN PATENT DOCUMENTS

| CN | 2104253 U | 5/1992 |
| CN | 102444746 A | 5/2012 |
| CN | 203009905 U | 6/2013 |

(Continued)

Primary Examiner — Jason K Niesz

(57) ABSTRACT

A valve body, including a first cavity, a second cavity communicated with the first cavity through a second water inlet of the second cavity, a valve core and an elastic reset member; the valve core, arranged in the first cavity and coaxial with the second water inlet, includes a piston and a first ejector rod being coaxial with the piston; the piston is configured to open or close the second water inlet; the elastic reset member is configured to press the valve core to move in the axial direction to close the second water inlet. A self-locking level control valve is adopted. The water purifier achieves no reactive power loss, low emission and safe water quality, avoids frequent startup of the water purification system, and solves the technical problem of the "first glass of water" brought by the ultra-low pressure reverse osmosis pumpless water purification system.

17 Claims, 8 Drawing Sheets

(56) References Cited

FOREIGN PATENT DOCUMENTS

| | | | |
|---|---|---|---|
| CN | 103982702 | A | 8/2014 |
| CN | 205424049 | U | 8/2016 |
| CN | 109827001 | A | 5/2019 |
| CN | 209671730 | U | 11/2019 |
| JP | 0755020 | A | 3/1995 |

* cited by examiner

VALVE BODY

CROSS-REFERENCE TO RELATED APPLICATIONS

This application is a continuation of International Patent Application No. PCT/CN2020/079863 with a filing date of Mar. 18, 2020, designating the United States, now pending, and further claims priority to Chinese Patent Application No. 201910248951.3 with a filing date of Mar. 29, 2019. The content of the aforementioned applications, including any intervening amendments thereto, are incorporated herein by reference.

TECHNICAL FIELD

This disclosure relates to the field of water purification, in particular to a valve body.

BACKGROUND

The ultra-low pressure reverse osmosis pumpless water purification system can directly convert tap water into purified water without electricity. It has broad application prospects for the household water purification market. However, the problem of "first glass of water" has always affected the application effects of various permeable membranes, among which the ultra-low pressure permeable membrane is particularly affected.

The "first glass of water" refers to the unqualified drinking water remaining in the membrane shell; when the water purification system stops running, the concentrated water remaining in the membrane shell and the purified water at the other side of the membrane interpenetrate under pressure, so that the purified water at the water purification end will be close to the concentrated water over time, so the purified water remaining in the membrane shell becomes unqualified drinking water.

For ultra-low pressure reverse osmosis membranes, this situation is much worse. If a water purifier is turned on very frequently and the duration is relatively short, the water remaining in the membrane shell will be unqualified. In this case, the more frequently water is taken, the more resultant unqualified water is. Therefore, if the system is not prevented from frequent starting, the water in the water tank will be the same as the tap water in a short time, or even worse when the water tank is used to store purified water. In recent years, major manufacturers in the household water purifier market have produced large-flux direct current water purifiers. However, in actual use by consumers, the use of water is less and the water purifier is frequently started. Therefore, consumers often drink the "first glass of water" in actual use. At the same time, the frequent startup of the water purification system increases the probability of damage to its electronic control components.

For small-flux water purifiers, storage buckets are used to store purified water. Most of these water purification systems use a pressure switch to control the start of the water purification system, and the pressure bucket, pressure switch and water purification faucet are directly connected. When the water purification faucet is turned on to fetch water, the pressure at the water purification end decays rapidly, causing the start of the water purification system to be uncontrollable. At the same time, a closed air bag is adopted in the water storage bucket to store water, and secondary pollution is often caused by the incoming air in the water storage bucket due to careless use, and this pollution is difficult to remove. One reason is that consumers are not aware of the existence of such pollution, and the other is that the fundamental way to remove such pollution is to replace the water storage bucket, thus causing economic losses to consumers.

When users collect the concentrated water, in order to prevent the collected concentrated water from overflowing, a larger bucket is usually placed next to the cabinet, which is not beautiful and takes up a lot of space. Even so, the unsatisfactory thing such as overflowing will still happen.

SUMMARY

The present disclosure provides a valve body to solve the problem that the ultra-low pressure permeable membrane only relies on tap water pressure drive to achieve purification.

In order to solve the above technical problem, the embodiments of the present disclosure provide the following technical solutions:

The present disclosure provides a valve body, including a first cavity, a second cavity, a valve core and an elastic reset member; wherein the first cavity and the second cavity communicate with each other through a second water inlet of the second cavity;

the second cavity includes a second water outlet arranged on a cavity wall of the second cavity and a first through hole arranged on the cavity wall of the second cavity opposite to the second water inlet;

the first cavity includes a first water inlet provided on a cavity wall of the first cavity;

the valve core, arranged in the first cavity and coaxial with the second water inlet, includes a piston and a first ejector rod being coaxial with the piston;

one end of the piston is a free end, and an other end of the piston is a switch end; the switch end is fixedly connected to one end of the first ejector rod; and an end surface of the switch end fits with the second water inlet, and is configured to open or close the second water inlet;

the first ejector rod passes through the second water inlet and the first through hole; an other end of the first ejector rod sticking out of the second cavity is a second movable end; the second movable end is a curved surface structure, and configured to push the piston to open the second water inlet when the second movable end is compressed in an axial direction;

one end of the elastic reset member is a first movable end, and an other end of the elastic reset member is a first fixed end; the first movable end abuts against the valve core; and the first fixed end abuts against the first cavity or the second cavity, and is configured to press the valve core to move in the axial direction to close the second water inlet.

Preferably, the cavity wall of the first cavity is provided with a plurality of ridged flow dividing plates along the axial direction of the piston; and top edges of the ridged flow dividing plates are parallel to each other and forms a first passage around an axis of the piston; the first passage is matched with the piston to make the piston move in the axial direction.

Preferably, the first passage is a cylindrical passage.

Preferably, the first water inlet is arranged on the cavity wall of the first cavity between two adjacent ridged flow dividing plates.

Preferably, the first through hole and the second water inlet are coaxial.

Preferably, the second movable end is a spherical structure.

Preferably, the end surface of the switch end is provided with a first seal gasket for sealingly connecting the piston and the second water inlet under an action of an elastic force of the elastic reset member.

Preferably, the elastic reset member is coaxial with the valve core.

Preferably, the first fixed end of the elastic reset member abuts against the cavity wall of the first cavity opposite to the second water inlet.

Preferably, the free end is in a 凸-shaped end; an end surface of the free end is a top of the 凸-shaped end.

Preferably, the second cavity further includes a cylindric stroke positioner;

the cylindric stroke positioner is fixedly connected to the cavity wall of the second cavity; an opening of the cylindric stroke positioner matches with the first through hole; and a bottom of the cylindric stroke positioner has a second through hole coaxial with the second water inlet; the first ejector rod passes through the second through hole.

Preferably, at least one layer of a first sealing ring surrounding the first ejector rod and sealing the second through hole is provided within the cylindric stroke positioner.

Preferably, the elastic reset member is a first reset spring; and the first movable end of the first reset spring abuts against the end surface of the free end.

Preferably, the elastic reset member includes a second reset spring, a sealing tympanic membrane and a supporting partition;

an edge of the sealing tympanic membrane is connected to the cavity wall of the first cavity in a sealed manner to form a enclosed cavity; outside the enclosed cavity, one side of the enclosed cavity abuts against the end face of the free end of the piston; inside the enclosed cavity, an other side of the enclosed cavity abuts against one side of the supporting partition;

inside the enclosed cavity, one end of the second reset spring abuts against the cavity wall of the first cavity opposite to the supporting partition; an other end of the second reset spring abuts against an other side of the supporting partition.

Preferably, the first ejector rod is movably connected to the first through hole in a sealed manner.

Preferably, the first fixed end of the elastic reset member abuts against the second cavity.

Preferably, the elastic reset member is a third reset spring; the first fixed end of the third reset spring abuts against an outer wall of the second cavity.

Preferably, a part of the first ejector rod that passes through the first through hole has a stopper, and the stopper abuts against a movable end of the third reset spring.

Preferably, the valve body further includes a base;

the base has a first groove; an inner wall of the first groove is fixedly connected to the outer wall of the second cavity; a bottom of the first groove is provided a third through hole coaxial with the second water inlet; the first ejector rod passes through the third through hole.

Preferably, the base is an upper wall of a third cavity;

the third cavity includes a rocker arm connected to a rotating shaft of a cavity wall of the third cavity, a reset hole penetrating through an upper wall of the third cavity, and a second ejector rod penetrating through a lower wall of the third cavity;

the rocker arm has an "L"-shaped longitudinal section and includes a long arm, a short arm fixedly connected to the long arm and the rotating shaft arranged at a connecting portion; the rocker arm is slidably connected with the first ejector rod; an end of the long arm passes through the reset hole to control a downward movement of the end of the long arm, and the first ejector rod is moved upward through the short arm, such that the second water inlet is opened by the piston;

the second ejector rod is arranged below the end of the long arm and is configured to control the end of the long arm to move upward, the short arm drives the first ejector rod to move downwards, such that the second water inlet is closed by the piston.

Preferably, the second ejector rod further includes a floating ball fixedly connected to an end of the second ejector rod extending outside the third cavity and is configured to control the end of the long arm to move upwards when the floating ball moves upward with the liquid, such that the second water inlet is closed by the piston.

Preferably, an angle between the short arm and the long arm is configured as a concave curved groove; an end of the short arm is configured as a support plane parallel to an axle of the rotating shaft and with a same vertical axis as the axis of the rotating shaft; an surface of the short arm between the concave curved groove and the support plane is configured as a convex curved surface;

the second movable end of the first ejector rod is slidably connected with the supporting plane, the convex curved surface and the concave curved groove of the short arm.

Preferably, the base has a first support fixedly connected on one side of the base where the second movable end passing through; an other end of the first support is connected with the rotating shaft at one end of the movable connecting rod; the movable connecting rod abuts against the first ejector rod.

Based on the disclosure of the foregoing embodiments, it can be known that the embodiments of the present disclosure have the following beneficial effects:

The present disclosure provides a valve body, including a first cavity, a second cavity, a valve core and an elastic reset member; wherein the first cavity and the second cavity communicate with each other through a second water inlet of the second cavity;

the second cavity includes a second water outlet arranged on a cavity wall of the second cavity and a first through hole arranged on the cavity wall of the second cavity opposite to the second water inlet;

the first cavity includes a first water inlet provided on a cavity wall of the first cavity;

the valve core, arranged in the first cavity and coaxial with the second water inlet, includes a piston and a first ejector rod being coaxial with the piston;

one end of the piston is a free end, and an other end of the piston is a switch end; the switch end is fixedly connected to one end of the first ejector rod; and an end surface of the switch end fits with the second water inlet, and is configured to open or close the second water inlet;

the first ejector rod passes through the second water inlet and the first through hole; an other end of the first ejector rod sticking out of the second cavity is a second movable end; the second movable end is a curved surface structure, and configured to push the piston to open the second water inlet when the second movable end is compressed in an axial direction;

one end of the elastic reset member is a first movable end, and an other end of the elastic reset member is a first fixed end; the first movable end abuts against the valve core; and the first fixed end abuts against the first cavity or the second cavity, and is configured to press the valve core to move in the axial direction to close the second water inlet.

The present disclosure adopts a self-locking level control valve. Through a simple design of a water purification control system, the water purifier achieves no reactive power loss, low emission and safe water quality, avoids frequent startup of the water purification system, and solves the technical problem of the "first glass of water" brought by the ultra-low pressure reverse osmosis pumpless water purification system. The self-locking level control valve does not require the valve body to immerse in the water, avoiding the problem of secondary pollution caused by the valve body after long-term use.

When the self-locking water shut-off valve is used for waste water recycling and reuse, if the concentrated water collected in the water tank is full, the water tank is automatically locked to prevent the concentrated water from entering to avoid overflow of the concentrated water. At this time, the concentrated water flows through the opened pressure limiting valve to the floor drain.

DESCRIPTION OF REFERENCE SIGNS

Figure 1:
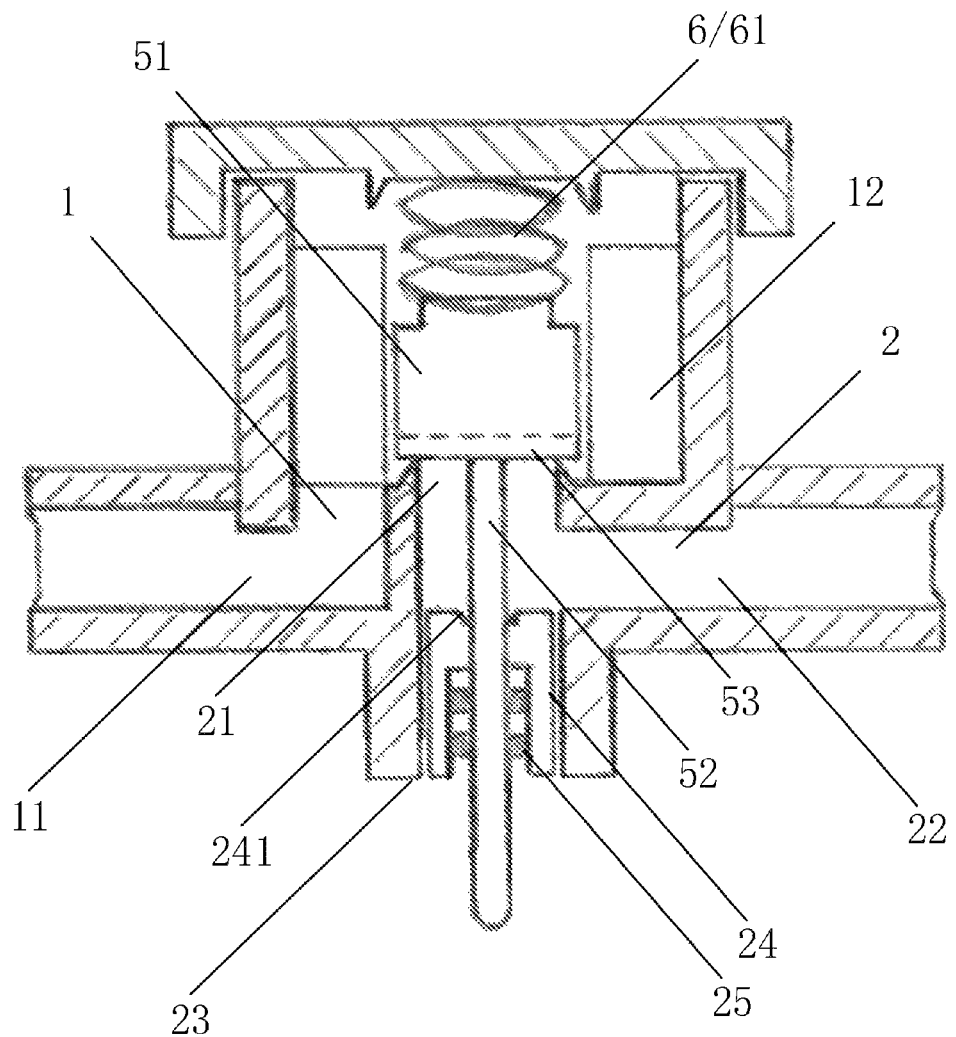
FIG. 1 is a schematic structural diagram of a valve body provided by an embodiment of the present disclosure.

1—first cavity, 2—second cavity, 3—base, 4—third cavity, 5—valve core, 6—elastic reset member;

11—first water inlet, 12—flow dividing plate, 13—first passage;

21—second water inlet, 22—second water outlet, 23—first through hole, 24—cylindric stroke positioner, 25—first sealing ring;

241—second through hole;

31—first groove, 32—third through hole, 33—first support, 34—movable connecting rod;

41—rocker arm, 42—second ejector rod, 43—reset hole, 44—floating ball;

411—short arm, 412—long arm, 413—rotation shaft;

4111—support plane, 4112—convex curved surface, 4113—concave curved groove;

51—piston, 52—first ejector rod, 53—first sealing gasket;

521—stopper;

61—first reset spring, 62—second reset spring, 63—sealing tympanic membrane, 64—support partition, 65—third reset spring.

DETAILED DESCRIPTION OF PREFERRED EMBODIMENTS

In the following, specific embodiments of the present disclosure will be described in detail with reference to the accompanying drawings, which do not limit the present disclosure.

It should be understood that various modifications can be made to the embodiments disclosed herein. Therefore, the above description should not be regarded as a limitation, but merely as preferred embodiments of the present disclosure. Those skilled in the art will think out other modifications within the scope and spirit of the present disclosure.

The drawings included in the specification and constituting a part of the specification illustrate the embodiments of the present disclosure, and are used for explanation principle of the present disclosure together with the general description of the disclosure given above and the detailed description of the embodiments given below.

The characteristics of the present disclosure will become apparent from the following description of preferred embodiments of non-limiting examples with reference to the accompanying drawings.

It should also be understood that although the disclosure has been described with reference to some specific examples, those skilled in the art can surely implement many other equivalent forms of the disclosure, which have the features described in the claims and therefore fall in the protection scope of the present disclosure.

When combined with the accompanying drawings, in view of the following detailed description, the above and other aspects, features and advantages of the present disclosure will become more apparent.

Specific embodiments of the present disclosure will be described with reference to the accompanying drawings; however, it should be understood that the disclosed embodiments are merely examples of the present disclosure, which can be implemented in various ways. Well-known and/or repeated functions and structures are not described in detail to avoid unnecessary or redundant details that may obscure the present disclosure. Therefore, the specific structural and functional details disclosed herein are not intended to limit the present disclosure, but merely serve as the basis and representative basis of the claims to teach those skilled in the art to use the present disclosure in a variety of ways with substantially any suitable detailed structure.

This specification may use the phrases "in one embodiment", "in another embodiment", "in yet another embodiment" or "in other embodiments", which can all refer to one or more of the same or different embodiments of the disclosure.

The present disclosure provides a flush valve for cleaning ultra-low pressure reverse osmosis membranes and a water purification system, detailed descriptions of which will be explained seriatim in the following embodiments.

The first embodiment provided in the present disclosure is an embodiment of a flush valve for cleaning ultra-low pressure reverse osmosis membranes.

Figure 2:
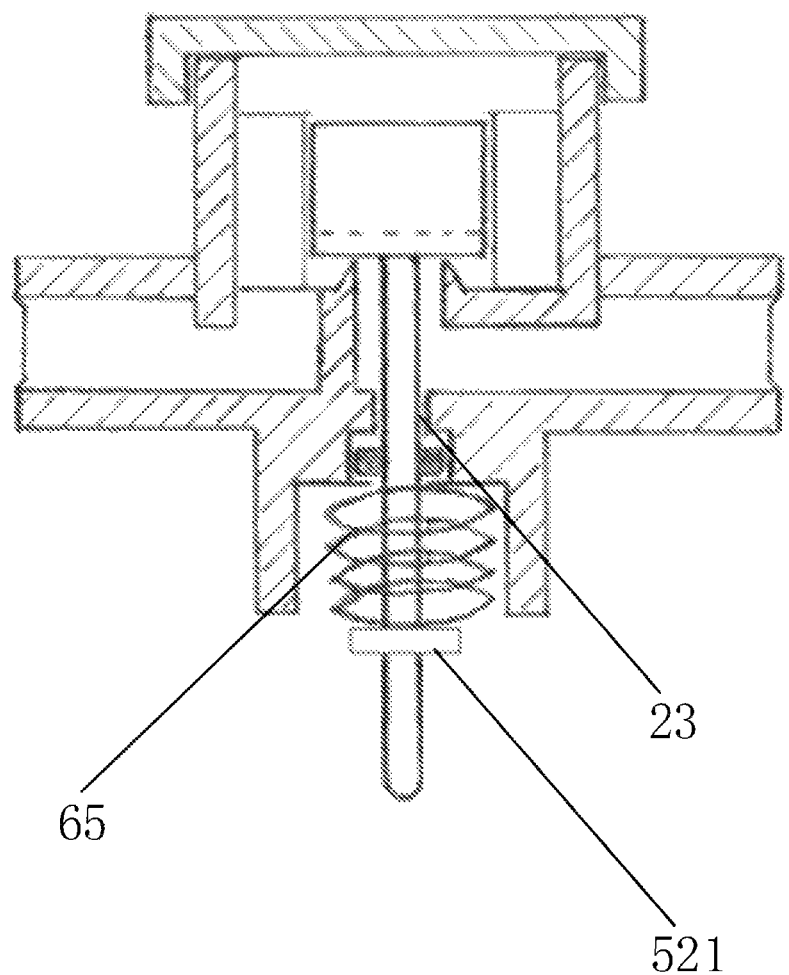
FIG. 2 is a schematic structural diagram of another valve body provided by an embodiment of the present disclosure.
Figure 3:
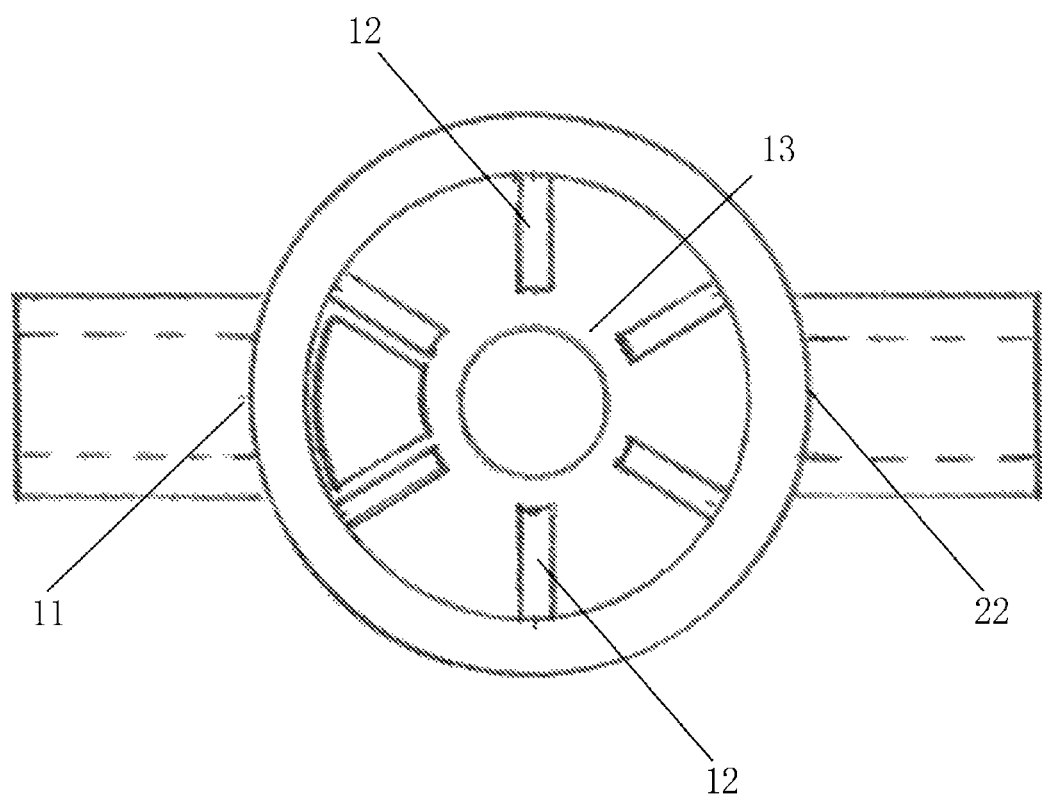
FIG. 3 is a top view of a first cavity provided by an embodiment of the present disclosure.
Figure 4:
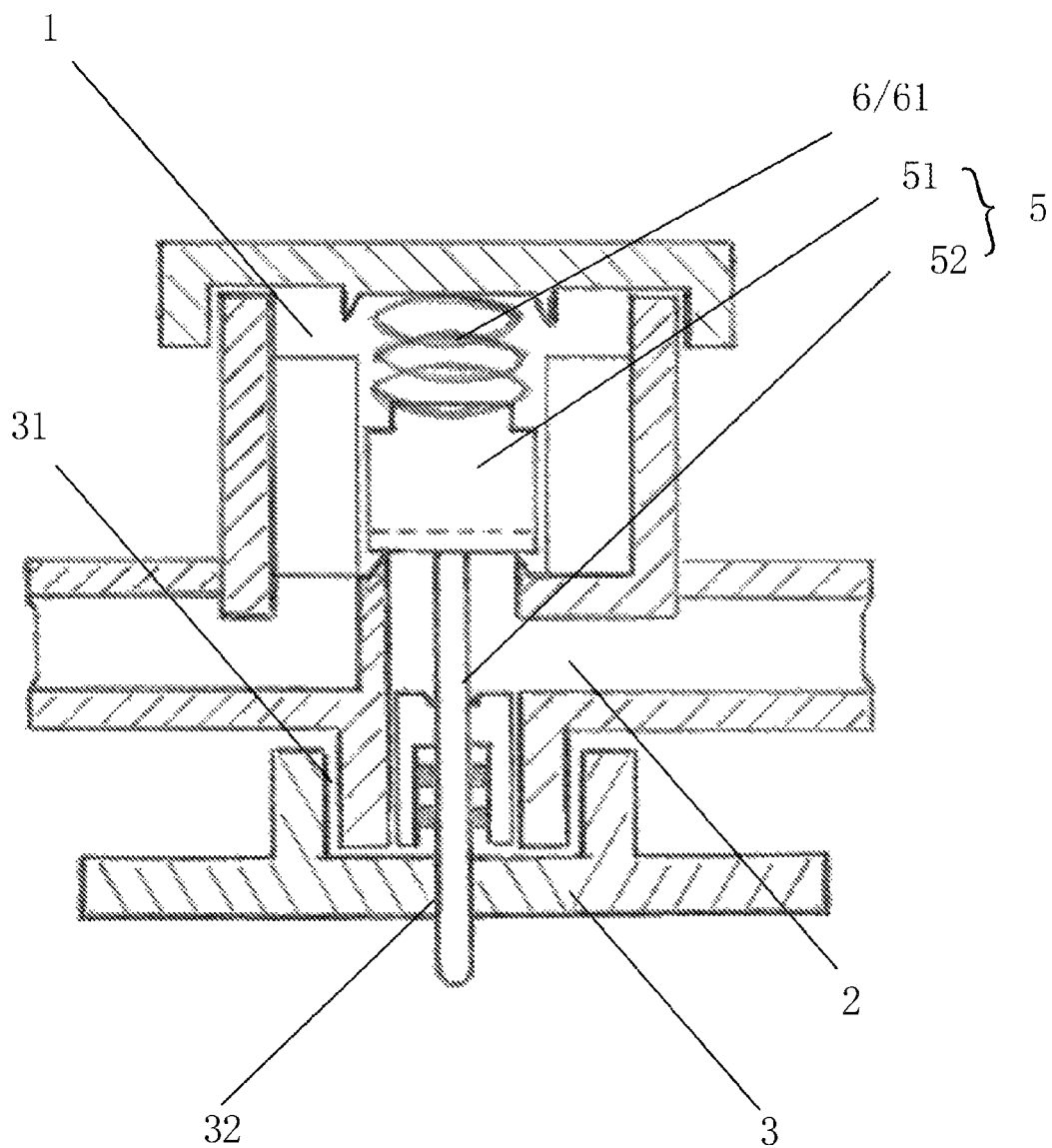
FIG. 4 is a schematic structural diagram of a valve body with a base provided by an embodiment of the present disclosure.
Figure 5:
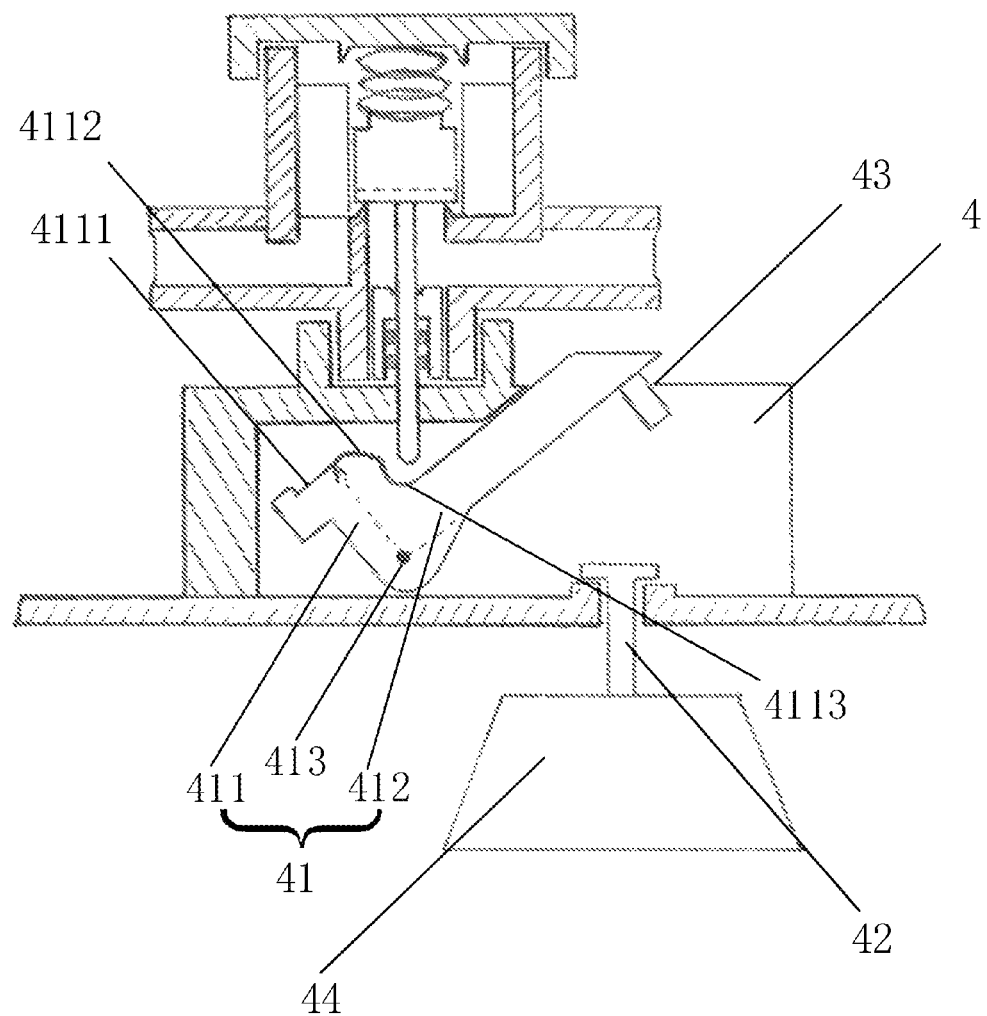
FIG. 5 is a schematic structural diagram of a valve body applied to a water purification system according to an embodiment of the present disclosure.
Figure 6:
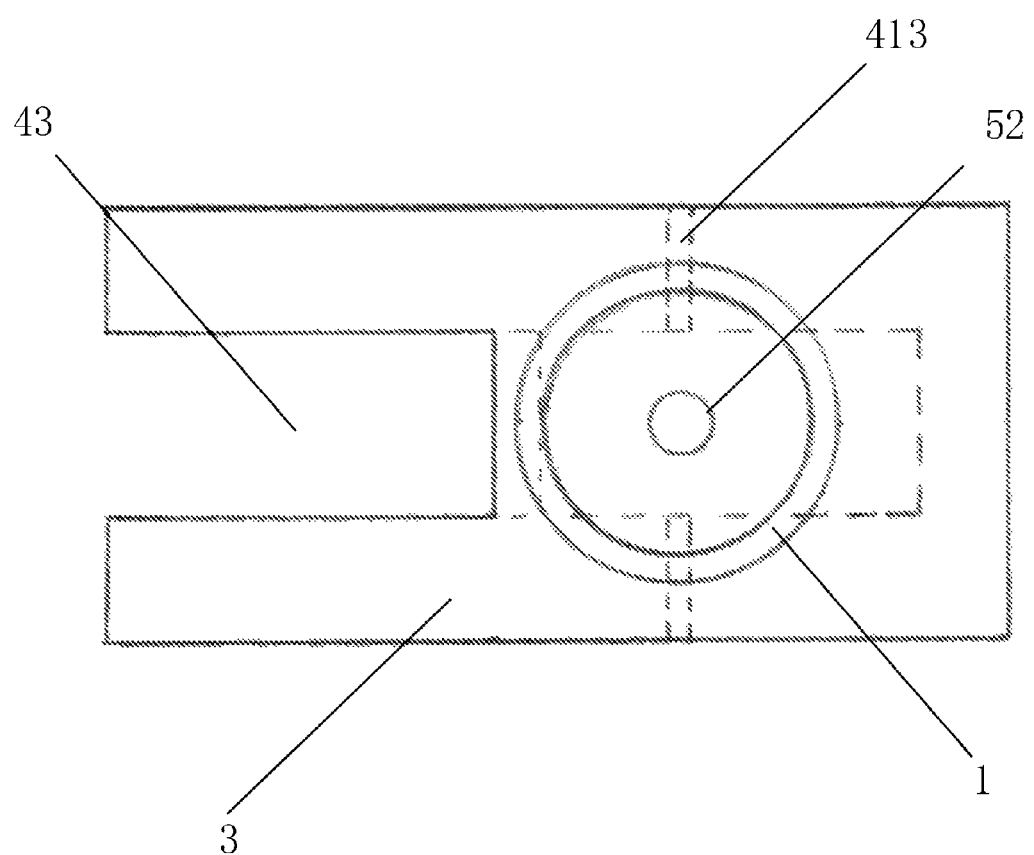
FIG. 6 is a top view of a third cavity provided by an embodiment of the present disclosure.
Figure 7:
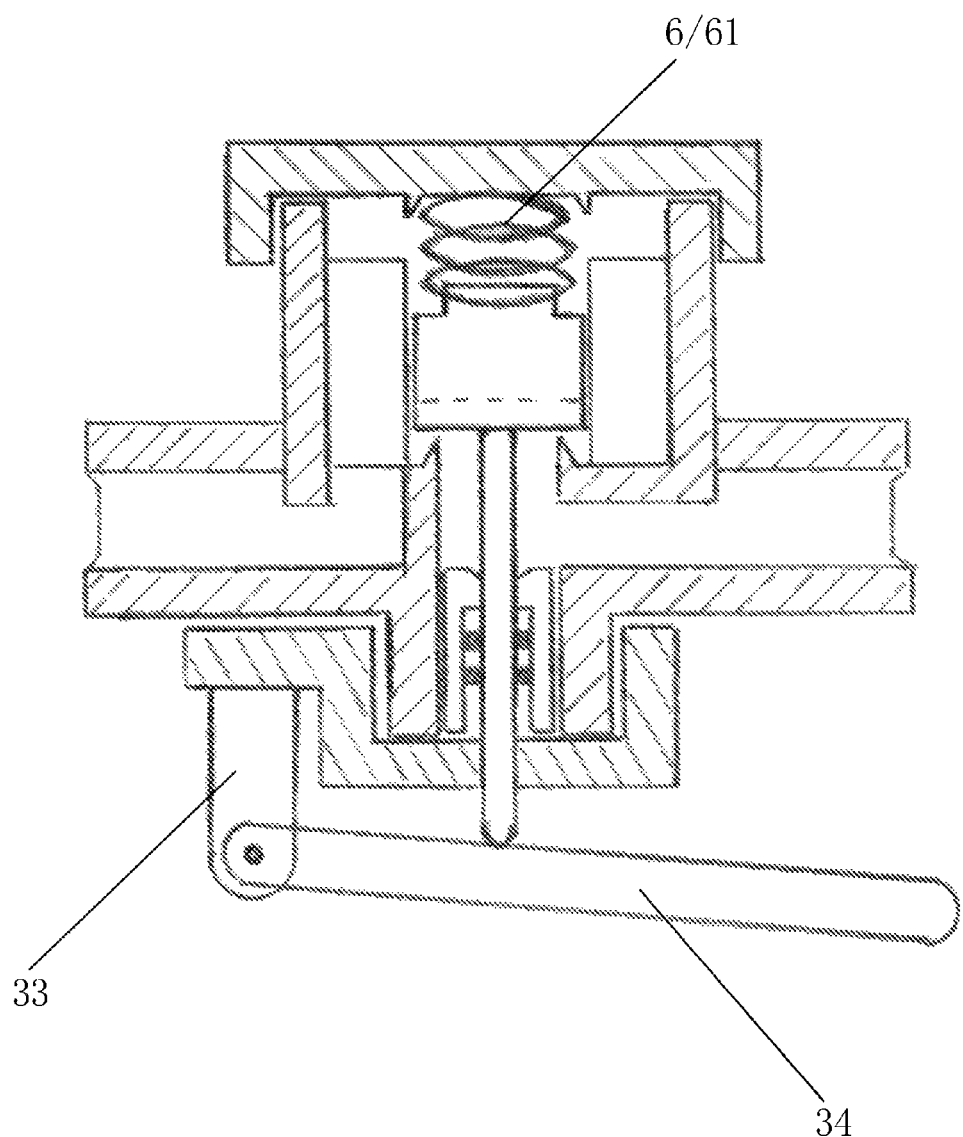
FIG. 7 is a schematic structural diagram of a water shut-off valve provided by an embodiment of the present disclosure.
Figure 8:
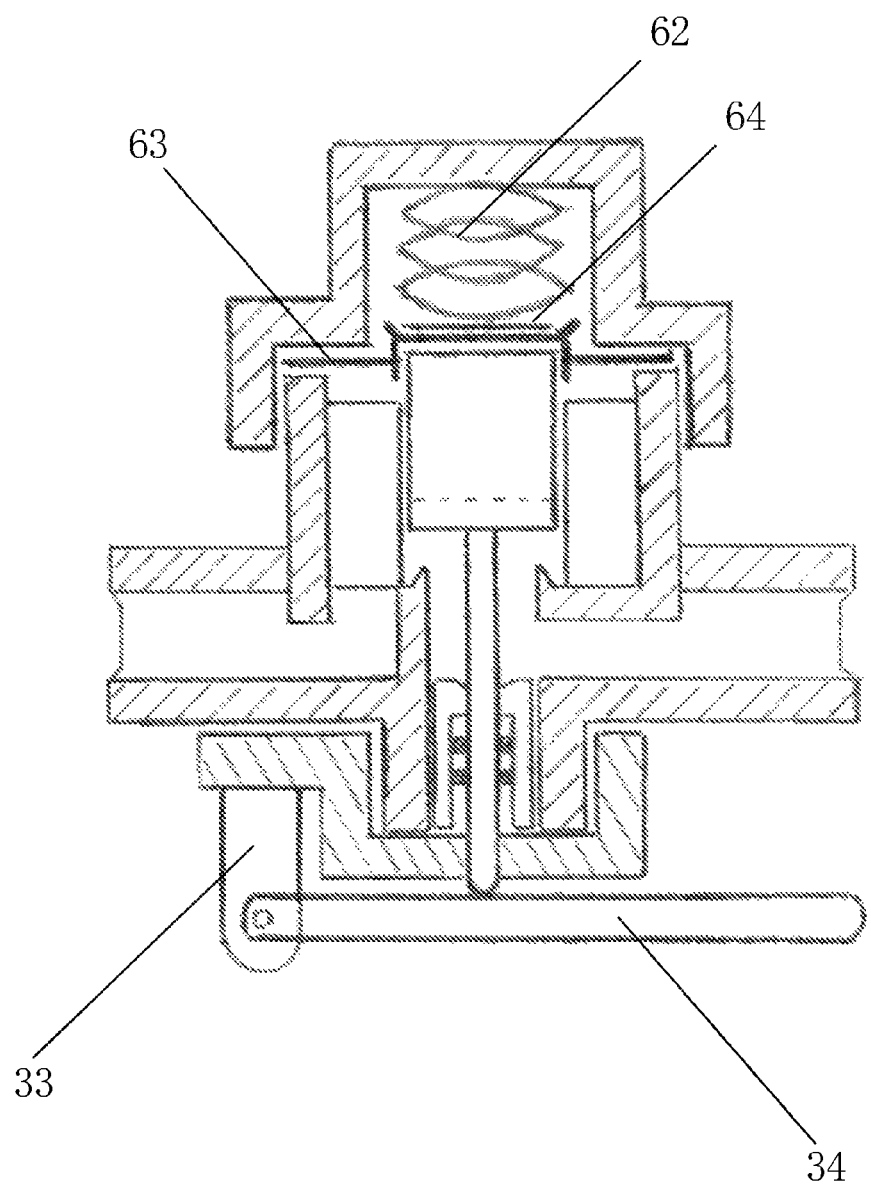
FIG. 8 is a schematic structural diagram of another water shut-off valve provided by an embodiment of the present disclosure.

Embodiments will be described in detail below with reference to FIGS. 1-8, in which FIG. 1 is a schematic structural diagram of a valve body provided by an embodiment of the present disclosure; FIG. 2 is a schematic structural diagram of another valve body provided by an embodiment of the present disclosure; FIG. 3 is a top view of a first cavity provided by an embodiment of the present disclosure; FIG. 4 is a schematic structural diagram of a valve body with a base provided by an embodiment of the present disclosure; FIG. 5 is a schematic structural diagram of a valve body applied to a water purification system according to an embodiment of the present disclosure; FIG. 6 is a top view of a third cavity provided by an embodiment of the present disclosure; FIG. 7 is a schematic structural diagram of a water shut-off valve provided by an embodiment of the present disclosure; FIG. 8 is a schematic structural diagram of another water shut-off valve provided by an embodiment of the present disclosure.

Please refer to FIG. 1, the present embodiment provides a valve body, including a first cavity 1, a second cavity 2, a valve core 5 and an elastic reset member 6; wherein the first cavity 1 and the second cavity 2 communicate with each other through a second water inlet 21 of the second cavity 2.

The second cavity 2 includes a second water outlet 22 arranged on a cavity wall of the second cavity and a first through hole 23 arranged on the cavity wall of the second cavity opposite to the second water inlet 21.

Preferably, the first through hole 23 and the second water inlet 21 are coaxial.

The first cavity 1 includes a first water inlet 11 provided on a cavity wall of the first cavity.

The valve core 5, arranged in the first cavity 1 and coaxial with the second water inlet 21, includes the elastic reset member 6, a piston 51 and a first ejector rod 52 being coaxial with each other.

One end of the piston 51 is a free end, and an other end of the piston 51 is a switch end; the switch end is fixedly connected to one end of the first ejector rod 52; and an end surface of the switch end fits with the second water inlet 21, and is configured to open or close the second water inlet 21.

Preferably, the end surface of the switch end is provided with a first seal gasket 53 for sealingly connecting the piston 51 and the second water inlet 21 under an action of an elastic force of the elastic reset member 6.

The first ejector rod 52 passes through the second water inlet 21 and the first through hole 23; an other end of the first ejector rod 52 sticking out of the second cavity 2 is a second movable end; the second movable end is a curved surface structure, and configured to push the piston 51 to open the second water inlet 21 when the second movable end is compressed in an axial direction.

Preferably, the second movable end is a spherical structure.

One end of the elastic reset member 6 is a first movable end, and an other end of the elastic reset member is a first fixed end; the first movable end abuts against the valve core 5; and the first fixed end abuts against the first cavity 1 or the second cavity 2, and is configured to press the valve core 5 to move in the axial direction to close the second water inlet 21.

Please refer to FIG. 3, preferably, the cavity wall of the first cavity 1 is provided with a plurality of ridged flow dividing plates 12 along the axial direction of the piston 51; and top edges of the ridged flow dividing plates 12 are parallel to each other and forms a first passage 13 around an axis of the piston; the first passage 13 is matched with the piston 51 to make the piston 51 move in the axial direction.

Preferably, the plurality of ridged flow dividing plates 12 are evenly arranged on the cavity wall of the first cavity 1.

The evenly arranged flow dividing plates 12 in the first cavity 1 effectively avoids an impact of a vortex on the valve core 5. The valve core 5 can be opened/closed more smoothly in different pressure environments. Water hammer or splashing caused by opening the valve instantaneously are avoided.

Preferably, the first passage 13 is a cylindrical passage.

Preferably, the first water inlet 11 is arranged on the cavity wall of the first cavity 1 between two adjacent ridged flow dividing plates 12. Preferably, the elastic reset member 6 is coaxial with the valve core 5.

Preferably, a first fixed end of the elastic reset member 6 abuts against the cavity wall of the first cavity 1 opposite to the second water inlet 21.

Preferably, the free end is in a 凸-shaped end; an end surface of the free end is a top of the 凸-shaped end.

Preferably, the second cavity 2 further includes a cylindric stroke positioner 24.

The cylindric stroke positioner 24 is fixedly connected to the cavity wall of the second cavity 2; an opening of the cylindric stroke positioner matches with the first through hole 23; and a bottom of the cylindric stroke positioner has a second through hole 241 coaxial with the second water inlet 21; the first ejector rod 52 passes through the second through hole 241.

The purpose of setting the cylindric stroke positioner 24 in this embodiment is to ensure that the first ejector rod 52 moves in the axial direction, and will not be deformed by force during movement. The cylindric stroke positioner 24 and the second cavity 2 may be integrated, or welded as a whole, or screwed together.

Preferably, at least one layer of a first sealing ring 25 surrounding the first ejector rod 52 and sealing the second through hole 241 is provided within the cylindric stroke positioner 24. Lubricating oil is added into the cylindric stroke positioner 24 or between the first sealing rings 25 to reduce the friction of the movement of the first ejector rod 52 and increase the sealing effect of the second cavity 2.

Please refer to FIG. 1, preferably, the elastic reset member 6 is a first reset spring 61; and the first movable end of the first reset spring 61 abuts against the end surface of the free end.

Please refer to FIG. 8, preferably, the elastic reset member 6 includes a second reset spring 62, a sealing tympanic membrane 63 and a supporting partition 64;

an edge of the sealing tympanic membrane 63 is connected to the cavity wall of the first cavity 1 in a sealed manner to form a enclosed cavity; outside the enclosed cavity, one side of the enclosed cavity abuts against the end face of the free end of the piston 51; inside the enclosed cavity, an other side of the enclosed cavity abuts against one side of the supporting partition 64;

inside the enclosed cavity, one end of the second reset spring 62 abuts against the cavity wall of the first cavity 1 opposite to the supporting partition 64; an other end of the second reset spring abuts against an other side of the supporting partition 64.

Through the sealing tympanic membrane 63, the erosion to the second reset spring 62 caused by the strong corrosive water (for example, concentrated water) is avoided, thereby reducing the probability of the piston 51 being ineffectively closed.

Preferably, the first ejector rod 52 is movably connected to the first through hole 23 in a sealed manner.

Preferably, a first fixed end of the elastic reset member 6 abuts against the second cavity 2.

Please refer to FIG. 2, preferably, the elastic reset member 6 is a third reset spring 65; the first fixed end of the third reset spring 65 abuts against an outer wall of the second cavity 2.

Preferably, a part of the first ejector rod 52 that passes through the first through hole 23 has a stopper 521, and the stopper 521 abuts against a movable end of the third reset spring 65.

This embodiment provides a first specific application scenario for the above valve body: a self-locking level control valve applied to a water purification tank of a water purification system.

Please refer to FIG. 4, the valve body further includes a base 3.

The base 3 has a first groove 31; an inner wall of the first groove 31 is fixedly connected to the outer wall of the second cavity 2; a bottom of the first groove 31 is provided a third through hole 32 coaxial with the second water inlet 21; the first ejector rod 52 passes through the third through hole 32.

Please refer to FIGS. 5-6, the base 3 is an upper wall of a third cavity 4.

The third cavity 4 includes a rocker arm 41 connected to a rotating shaft 413 of a cavity wall of the third cavity 4, a reset hole 43 penetrating through an upper wall of the third cavity 4, and a second ejector rod 42 penetrating through a lower wall of the third cavity 4.

The rocker arm 41 has an "L"-shaped longitudinal section and includes a long arm 412, a short arm 411 fixedly connected to the long arm 412 and the rotating shaft 413 arranged at a connecting portion; the rocker arm 41 is slidably connected with the first ejector rod 52; an end of the long arm 412 passes through the reset hole 43 to control a downward movement of the end of the long arm 412, and the first ejector rod 52 is moved upward through the short arm 411, such that the second water inlet 21 is opened by the piston 51.

By setting a motion of the rotating shaft 413, the second movable end of the first ejector rod 52 is forced to move along the surface of the rocker arm 41; and the first ejector rod 52 is moved up and down through changes in the surface of the rocker arm 41, such that the purpose of opening or closing the piston 51 is achieved, and the stability or sensitivity of the movement of the piston 51 is improved.

An end of the long arm 412 passes through the reset hole 43 to control a downward movement of the end of the long arm 412, thereby making a liquid flow from the first cavity 1 to the second cavity 2.

The second ejector rod 42 is arranged below the end of the long arm 412 and is configured to control the end of the long arm 412 to move upward, the short arm 411 drives the first ejector rod 52 to move downwards, such that the second water inlet 21 is closed by the piston 51.

Preferably, the second ejector rod 42 further includes a floating ball 44 fixedly connected to an end of the second ejector rod 42 extending outside the third cavity 4 and is configured to control the end of the long arm 412 to move upwards when the floating ball 44 moves upward with the liquid, such that the second water inlet 21 is closed by the piston 51.

Preferably, an angle between the short arm 411 and the long arm 412 is configured as a concave curved groove 4113; an end of the short arm 411 is configured as a support plane 4111 parallel to an axle of the rotating shaft 413 and with a same vertical axis as the axis of the rotating shaft 413; an surface of the short arm 411 between the concave curved groove 4113 and the support plane 4111 is configured as a convex curved surface 4112.

The second movable end of the first ejector rod 52 is slidably connected with the supporting plane 4111, the convex curved surface 4112 and the concave curved groove 4113 of the short arm 411.

The valve body is installed on the top of the water purification tank, and the floating ball 44 is placed in the water purification tank. When the purified water in the water purification tank reaches the top of the water purification tank, the floating ball 44 is forced to float up, so that the second ejector rod 42 pushes the long arm 412 to move upward, and the two movable end of the first ejector rod 52 reaches the concave curved groove 4113 from the support plane 4111 through the convex curved surface 4112. Since the gravity of the rocker arm 41 cannot overcome the axial rebound force of the first ejector rod 52, the valve body is completely locked and closed. The second water inlet 21 is closed by the switch end of the piston 51, and the water purification stops at this time. After the user takes out the purified water in the water purification tank, the end of the long handle 412 is pressed down again, so that the convex curved surface 4112 of the rocker arm 41 is slidably connected to the second movable end of the first ejector rod 52, the first ejector rod 52 is forced to move upwards until the support plane 4111 and the first ejector rod 52 are slidably connected to form a relatively stable balance, and the valve body is fully opened.

The self-locking level control valve avoids the frequent startup of the water purification system when taking water, and ensures the stability of the water quality at the same time.

The present embodiment provides a second specific application scenario for the above valve body: a water shut-off valve applied in the water purification system.

Please refer to FIG. 4, the valve body further includes a base 3.

The base 3 has a first groove 31; an inner wall of the first groove 31 is fixedly connected to the outer wall of the second cavity 2; a bottom of the first groove 31 is provided a third through hole 32 coaxial with the second water inlet 21; the first ejector rod 52 passes through the third through hole 32.

Please refer to FIGS. 7-8, preferably, the base 3 has a first support 33 fixedly connected on one side of the base 3 where the second movable end passing through; an other end of the first support 33 is connected with the rotating shaft 413 at one end of the movable connecting rod 34; the movable connecting rod 34 abuts against the first ejector rod 52.

When the movable connecting rod 34 presses the first ejector rod 52, the second water inlet 21 can be opened to allow the liquid to flow from the first cavity 1 into the second cavity 2. When the movable connecting rod 34 is released to press the first ejector rod 52, the piston 51 can close the second water inlet 21 under the elastic force of the elastic reset member 6, and the liquid stops flowing from the first cavity 1 into the second cavity 2.

The present disclosure adopts a self-locking level control valve. Through a simple design of a water purification control system, the water purifier achieves no reactive power loss, low emission and safe water quality, avoids frequent startup of the water purification system, and solves the technical problem of the "first glass of water" brought by the ultra-low pressure reverse osmosis pumpless water purification system. The self-locking level control valve does not require the valve body to immerse in the water, avoiding the problem of secondary pollution caused by the valve body after long-term use.

When the self-locking water shut-off valve is used for waste water recycling and reuse, if the concentrated water collected in the water tank is full, the water tank is automatically locked to prevent the concentrated water from entering to avoid overflow of the concentrated water. At this time, the concentrated water flows through the opened pressure limiting valve to the floor drain.

The above embodiments are only exemplary embodiments of the disclosure, and are not used to limit the disclosure, and the protection scope of the disclosure is defined by the claims. Those skilled in the art can make various modifications or equivalent substitutions to this disclosure within the essence and protection scope of this disclosure, and such modifications or equivalent substitutions shall also be deemed to fall within the protection scope of this disclosure.

What is claimed is:

1. A valve body, comprising a first cavity, a second cavity, a valve core and an elastic reset member; wherein the first cavity and the second cavity communicate with each other through a second water inlet of the second cavity;

the second cavity comprises a second water outlet arranged on a cavity wall of the second cavity and a first through hole arranged on the cavity wall of the second cavity opposite to the second water inlet;

the first cavity comprises a first water inlet provided on a cavity wall of the first cavity;

the valve core, arranged in the first cavity and coaxial with the second water inlet, comprises a piston and a first ejector rod being coaxial with the piston;

one end of the piston is a free end, and another end of the piston is a switch end; the switch end is fixedly connected to one end of the first ejector rod; and an end surface of the switch end fits with the second water inlet, and is configured to open or close the second water inlet;

the first ejector rod passes through the second water inlet and the first through hole; another end of the first ejector rod sticking out of the second cavity is a second movable end; the second movable end is a curved surface structure, and configured to push the piston to open the second water inlet when the second movable end is compressed in an axial direction;

one end of the elastic reset member is a first movable end, and another end of the elastic reset member is a first fixed end; the first movable end abuts against the valve core; and the first fixed end abuts against the first cavity or the second cavity, and is configured to press the valve core to move in the axial direction to close the second water inlet;

wherein the valve body further comprises a base; the base has a first groove; an inner wall of the first groove is fixedly connected to the outer wall of the second cavity; a bottom of the first groove is provided a third through hole coaxial with the second water inlet the first ejector rod passes through the third through hole;

the base is an upper wall of a third cavity; the third cavity comprises a rocker arm connected to a rotating shaft of a cavity wall of the third cavity, a reset hole penetrating through an upper wall of the third cavity, and a second ejector rod penetrating through a lower wall of the third cavity;

the rocker arm has an "L"-shaped longitudinal section and comprises a long arm, a short arm fixedly connected to the long arm and the rotating shaft arranged at a connecting portion; the rocker arm is slidably connected with the first ejector rod; an end of the long arm passes through the reset hole to control a downward movement of the end of the long arm, causing the first ejector rod to move upward through the short arm, such that the second water inlet is opened by the piston;

the second ejector rod is arranged below the end of the long arm and is configured to control the end of the long arm to move upward, the short arm drives the first ejector rod to move downwards, such that the second water inlet is closed by the piston.

2. The valve body according to claim 1, wherein the first through hole and the second water inlet are coaxial.

3. The valve body according to claim 1, wherein the end surface of the switch end is provided with a first seal gasket for sealingly connecting the piston and the second water inlet under an action of an elastic force of the elastic reset member.

4. The valve body according to claim 1, wherein the second ejector rod further comprises a floating ball fixedly connected to an end of the second ejector rod extending outside the third cavity and is configured to control the end of the long arm to move upwards when the floating ball moves upward with the liquid, such that the second water inlet is closed by the piston.

5. The valve body according to claim 1, wherein an angle between the short arm and the long arm is configured as a concave curved groove; an end of the short arm is configured as a support plane parallel to an axle of the rotating shaft and with a same vertical axis as the axis of the rotating shaft; a surface of the short arm between the concave curved groove and the support plane is configured as a convex curved surface;

the second movable end of the first ejector rod is slidably connected with the supporting plane, the convex curved surface and the concave curved groove of the short arm.

6. The valve body according to claim 1, wherein the second cavity further comprises a cylindric stroke positioner;

the cylindric stroke positioner is fixedly connected to the cavity wall of the second cavity; an opening of the cylindric stroke positioner matches with the first through hole; and a bottom of the cylindric stroke positioner has a second through hole coaxial with the second water inlet; the first ejector rod passes through the second through hole.

7. The valve body according to claim 6, wherein at least one layer of a first sealing ring surrounding the first ejector rod and sealing the second through hole is provided within the cylindric stroke positioner.

8. The valve body according to claim 1, wherein the cavity wall of the first cavity is provided with a plurality of ridged flow dividing plates along the axial direction of the piston; and top edges of the ridged flow dividing plates are parallel to each other and forms a first passage around an axis of the piston; the first passage is matched with the piston to make the piston move in the axial direction.

9. The valve body according to claim 8, wherein the first passage is a cylindrical passage.

10. The valve body according to claim 8, wherein the first water inlet is arranged on the cavity wall of the first cavity between two adjacent ridged flow dividing plates.

11. The valve body according to claim 1, the first fixed end of the elastic reset member abuts against the cavity wall of the first cavity opposite to the second water inlet.

12. The valve body according to claim 11, wherein the elastic reset member is a first reset spring; and the first movable end of the first reset spring abuts against the end surface of the free end.

13. The valve body according to claim 11, wherein the elastic reset member comprises a second reset spring, a sealing tympanic membrane and a supporting partition;
   an edge of the sealing tympanic membrane is connected to the cavity wall of the first cavity in a sealed manner to form an enclosed cavity; outside the enclosed cavity, one side of the enclosed cavity abuts against the end face of the free end of the piston; inside the enclosed cavity, another side of the enclosed cavity abuts against one side of the supporting partition;
   inside the enclosed cavity, one end of the second reset spring abuts against the cavity wall of the first cavity opposite to the supporting partition; another end of the second reset spring abuts against another side of the supporting partition.

14. The valve body according to claim 1, wherein the first ejector rod is movably connected to the first through hole in a sealed manner.

15. The valve body according to claim 14, wherein the first fixed end of the elastic reset member abuts against the second cavity.

16. The valve body according to claim 15, wherein the elastic reset member is a third reset spring; the first fixed end of the third reset spring abuts against an outer wall of the second cavity.

17. The valve body according to claim 16, wherein a part of the first ejector rod that passes through the first through hole has a stopper, and the stopper abuts against a movable end of the third reset spring.

\* \* \* \* \*